May 14, 1935.  A. E. HOPKINS  2,000,954
BAIT CLIP
Filed Oct. 17, 1932
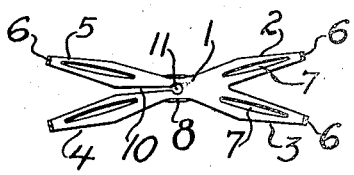
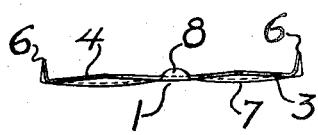
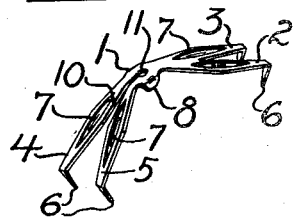
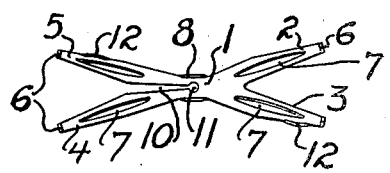
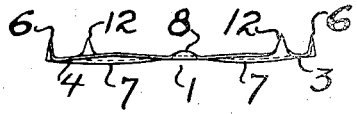
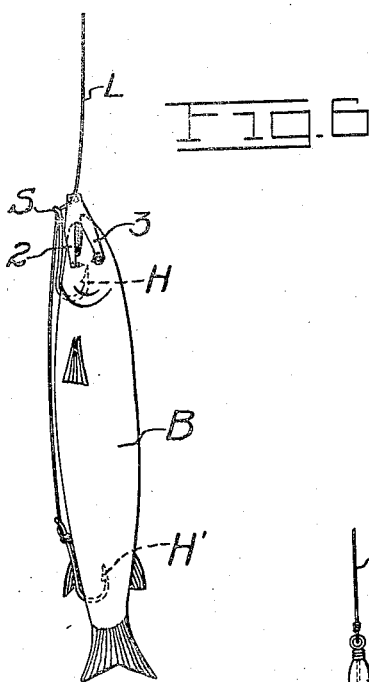
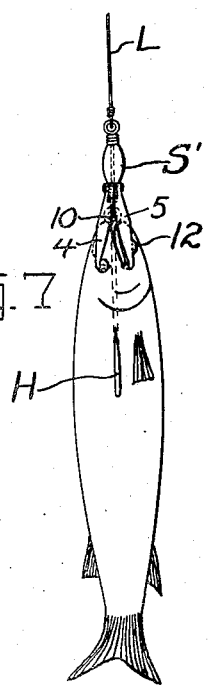
INVENTOR
Alva Elmer Hopkins
BY
Charles L. Reynolds
ATTORNEY Patented May 14, 1935

2,000,954

UNITED STATES PATENT OFFICE 2,000,954

BAIT CLIP

Alva Elmer Hopkins, Tacoma, Wash.

Application October 17, 1932, Serial No. 638,117

12 Claims. (Cl. 43—40)

My invention relates to fishing tackle, and more especially to a clip for holding bait to a fishing line or hook.

In this specification, while I refer to the fishing line, it is to be understood that this term means any portion of the equipment which is in tension while fishing, for instance, the leader, the shank of the hook, the line itself, portions of the swivel, and like parts of the fishing tackle.

Herring, minnows, pork, and the like are often used as bait for large fish such as salmon, and sometimes live bait is employed. All such bait is flabby or flexible, and must be well secured to the line or it will tear loose. All such bait is intended to be included in the term "live bait", as hereinafter employed. It is desirable that the bait, whether alive or preserved, be given as natural an appearance as possible, and allowed as great freedom of movement as possible, in order the better to simulate the natural movements of such a small fish, thereby to attract the larger fish, but it must not be permitted to impede too greatly the movement of the hook through the water. To these ends it is not sufficient merely to secure the bait upon a large hook, but it is usually customary to pass the hook through the herring (or other live bait, as hereinbefore defined) behind the head, and then to secure the head by suitable means, for instance, by tying a thread around it, to the shank of the hook, thus to hold the head close to the fishing line or shank of the hook, and to give the fish a more natural appearance and greater freedom of movement.

However, such means of clipping the bait to the line are inconvenient, especially when it is considered that fishing is carried out under cold, damp conditions, which are conducive to cold hands and general discomfort, such that the fingers are unsuitable to careful work and tying of tight knots in small thread. Furthermore, when the fish are biting it is necessary to work rapidly, and the bait cannot readily, quickly, and securely be tied on or secured in any way of which I am aware.

It is the object of my invention, then, to provide a clip which can be easily and quickly attached, under the conditions prevailing, to a fishing line, as above defined, in such position and so related to the hook and the bait that it can grasp the forward end (or for that matter any portion) of the bait, and hold it to the line or hook.

It is a further object to provide a device of this character which shall be extremely simple and cheap to manufacture, and small in size to offer little resistance when drawn through the water.

It is a further object to provide a device of this character, which shall be suitably reinforced so that it may be made of thin pliable material, yet be sufficiently strong where strength is needed.

A further object, in connection with a clip which is adapted to engage at opposite sides of the bait fish, at or beyond the jaw hinge, is to provide means associated with the clip to engage behind the jaw so that the jaw will not be permitted to sag open, thus to impede the progress of the bait through the water, or to permit the water entering through the open mouth to distend or rupture the fish.

My invention comprises the novel clip, and the novel parts thereof, relatively disposed and arranged as shown in the accompanying drawing, described in this specification, and as will be more particularly pointed out by the claims which terminate the same.

In the accompanying drawing I have shown my invention embodied in forms which are at present preferred by me, it being understood that various changes may be made therein within the scope of the claims.

Figure 1 is an inside view or plan view of my device in its preferred form as it would be manufactured and distributed, and Figure 2 is a side elevation of the same.

Figure 3 is a perspective view, showing the device in process of being bent, and in position to be attached to a line preparatory to clipping it upon the bait.

Figure 4 is a view similar to Figure 1, and Figure 5 is a view similar to Figure 2, showing a slightly modified form.

Figure 6 is an elevation of the preferred form of my device, applied to a common type of tackle employed in such fishing, and Figure 7 is a similar view showing the modified form in use, in conjunction with other tackle.

My device is applicable to all types of fishing tackle with which live bait or the like is employed, hence the representations of different forms of tackle in the drawing are not to be understood as limiting my device only to use with the particular type shown, for these are merely illustrative, and the manner of use of my device with other types of tackle will be obvious.

In essence, my device comprises a metal clip adapted to be bent in U-shape, and having cooperating terminal portions extending oppositely from a mid-portion, these terminal portions engaging the bait at opposite sides, and the mid-portion having means to engage the line, bearing in mind that the line, as defined above, may be any part of the fishing tackle or the shank of the hook itself. It is one of the advantages of my invention that it can be quickly applied to accomplish these objectives.

It is convenient to form the device of comparatively thin sheet metal having a mid-portion 1 and terminal portions one or both of which consists of pairs of legs, the individual legs being designated 2, 3, 4 and 5, respectively. As I have indicated, the legs 2 and 3, constituting a pair, are intended to be bent about the mid-portion to lie opposite the cooperating elements, which in this instance are the legs 4 and 5, so that they engage opposite sides of the bait at the head end, as may be seen in Figure 6, and in order to properly engage the bait the tips of these legs are pointed and bent in a direction which will direct them inwardly when the clip is bent in U-shape. These sharpened tips are indicated at 6. Since pressure is applied to bend the clip, for instance from the form shown in Figure 3 to the form shown in Figure 6, and it is necessary that the legs be of some length in order properly to engage the bait, I prefer that they be stiffened by ribs 7 extending longitudinally and pressed into the metal of the several legs.

For reasons which will appear hereafter it is not desirable that a single bend only be permitted at the mid-portion 1. I prefer that there be a space in the mid-portion which is unbent, and that the bend occur at the junction of the mid-portion to each pair of legs, as may be seen in Figure 3. To this end I may provide means associated with the mid-portion which will prevent bending at points inward of these junctions, and these means may conveniently be formed as upstanding flanges 8 along the longitudinal edges of the mid-portion.

In order to quickly and easily attach the clip to a line, generally designated by the letter L, I provide a slit 10 which extends inwardly from the margin of the metal piece to the mid-portion 1. In order that it may not weaken the metal unduly I prefer that it extend between two legs, and it is shown therefore as extending from between the legs 4 and 5 inwardly to the mid-portion 1, and at its inner end it may be somewhat enlarged to form a hole 11. In this hole the line L is received, and it is because this portion should always extend in a plane normal to the line, to prevent chafing, that the mid-portion is prevented from bending.

As will now be obvious, the clip, which is preferably slightly bent, is slipped upon the line L, passing the line through the slit 10 into the hole 11. The bait B has previously been caught on the hook H, or for instance upon two hooks H and H', and the clip is now brought into proximity to the nose of the bait, and bent until the tips 6 engage the head of the fish. One of the points 6 may enter at or near the eye, and the companion tip may enter at or near the jaw, and similarly the legs of the pair at the opposite side engage at similar points. Thus the bait is held firmly to the line. If it is desired to prevent bowing or bending of the bait, however, it is necessary that the mid-portion of the clip come in contact with some obstruction on the line, for instance, the point of splicing of the hook, indicated at S in Figure 6, or a portion of the swivel indicated at S' in Figure 7. This will prevent the clip from sliding along the line, and will hold the bait from bending or bowing between the clip and the point where the hook enters it.

In some instances it may be desirable to prevent the jaw of a herring from coming open, for the pressure of water, as the herring is dragged along, may tear the latter to pieces, and to this end I may provide a flange 12 on one or more of the legs, for instance, upon the legs 3 and 5, which when the clip is bent in U-shape will engage, one of them at least, beneath the jaw and outwardly from the point where the tip 6 engages the fish, thus to positively hold the jaw in place. Since this flange is pliable, it may be bent the better to engage the jaw or to hold it shut.

What I claim as my invention is:

1. A live-bait clip for use with fishing lines, for securing thereto live bait or the like, comprising a pliable metal device adapted to be bent into U-shape to engage opposite sides of a piece of bait, and formed with two legs at each side, a tip on each leg directed inwardly when the device is bent in U-shape, and means at the bend to engage and hold the line, by movement transversely of the length of the line.

2. A live-bait clip for use with fishing lines, for securing thereto live bait or the like, comprising a pliable metal device adapted to be bent into U-shape to engage opposite sides of a piece of bait, and having a slit extending inward from the edge of the device at the bend and adapted to receive the line and to hold the same.

3. A bait clip for use with fishing lines, comprising a pliable metal device adapted to be bent into U-shape to engage opposite sides of a piece of live bait or the like, and formed with two legs at each side, said clip having a slit extending from the mid-portion of the bend outward to its edge between the two legs at one side, whereby the line may be readily received and held in said slit, to hold the bait to the line.

4. A bait clip for use with fishing lines comprising a pliable metal device formed with a pair of legs and cooperating means extending oppositely from a mid-portion adapted to engage the bait at opposite sides, reinforcing means in the mid-portion to induce bending only at the junction of the mid-portion with the pair of legs and the cooperating means, respectively, and said device having a slit extending from between the legs inwardly within the mid-portion, whereby to engage and hold the fishing line.

5. A bait clip for use with fishing lines comprising a pliable metal device formed with two pairs of legs extending oppositely from a mid-portion, and adapted to be bent into U-shape, the tips of the legs being pointed and inwardly directed when so bent, flanges extending along the longitudinal edges of the mid-portion to prevent bending within such mid-portion, and said device being slit from between the legs of one pair inwardly to within the mid-portion, thereby to engage and hold the fishing line.

6. A bait clip for use with fishing lines comprising a pliable metal device formed with two pairs of legs extending oppositely from a mid-portion, and adapted to be bent into U-shape, reinforcing ribs upraised from said legs to stiffen them and to locate the bends at the inner ends thereof, and the tips of said legs being pointed and directed inwardly when so bent, and means at the mid-portion to engage and hold the line.

7. A bait clip for use with fishing lines comprising a pliable metal device formed with two pairs of legs extending oppositely from a mid-portion, and adapted to be bent into U-shape, the tips of the legs being pointed and directed inwardly when so bent, means at the mid-portion to engage and hold the line, and a flange inwardly directed from a leg, inwardly from its tip, to engage beneath and hold closed the jaw of a herring or the like which is held by the clip.

8. A live-bait clip for use in securing live bait or the like to a fishing line, comprising a device having an aperture open to an edge of the device for engaging the line above the hook, and having means spaced from such aperture to engage and hold the bait.

9. A live-bait clip for use in securing live bait or the like to a fishing line, comprising a pliable metal device having means disposed intermediate its ends, and opening to the edge of the device, for engaging the line above the hook, said device being adapted to be bent into U-shape, and further means adapted when the first means is so engaged with the line, to engage and hold opposite sides of the live bait.

10. A live-bait clip for use in securing live bait or the like to a fishing line, comprising means engageable with the line between its ends, by movement in a plane transversely of the line, and means associated with the first means to engage opposite sides of the live-bait, when the first means is so engaged with the line.

11. A bait clip for use in securing live bait or the like to a fishing line having an obstruction thereon, comprising means engageable with such obstruction to prevent movement of the clip lengthwise of the line past the obstruction, and means secured to the first means to engage the live-bait, when the first means is so engaged.

12. A live-bait clip for use with fishing lines comprising two opposite and rigid bait-engaging portions connected by a portion of greater flexibility, means at the latter portion for engaging a line, and the bait-engaging portions engaging opposite sides of the bait when the flexible intermediate portion is bent.

ALVA ELMER HOPKINS.